United States Patent [19]

Montbrun et al.

[11] 4,037,074

[45] July 19, 1977

[54] APPARATUS FOR THE CONTINUOUS APPLICATION OF A METALLIC COATING TO A METAL STRIP

[76] Inventors: Felix Montbrun, Quai Sadoine, 8, B.4100 Seraing; Roland Liesenborghs, Avenue du Hetre, 22, B.4200 Sclessin, both of Belgium

[21] Appl. No.: 570,472

[22] Filed: Apr. 22, 1975

[30] Foreign Application Priority Data

Apr. 22, 1974 Belgium .................................. 44555

[51] Int. Cl.[2] .................................................. B23K 9/00

[52] U.S. Cl. .................................. 219/121 P; 118/68

[58] Field of Search ..... 219/121 P, 121 EB, 121 EM, 219/76; 427/34, 421, 422, 423, 424, 434; 118/49, 49.1, 68, 64, 65

[56] References Cited

U.S. PATENT DOCUMENTS

| | | | |
|---|---|---|---|
| 2,250,561 | 7/1941 | Wissler | 219/76 X |
| 2,746,420 | 5/1956 | Steigerwald | 219/121 EB X |
| 3,010,009 | 11/1961 | Ducati | 219/76 |
| 3,071,678 | 1/1963 | Neely et al. | 219/76 |
| 3,211,886 | 10/1965 | Barkan et al. | 219/155 X |
| 3,325,620 | 6/1967 | Hunt et al. | 219/121 EB X |
| 3,394,678 | 7/1968 | Edwards et al. | 219/121 EB |
| 3,440,390 | 4/1969 | McCullough et al. | 219/121 EB |
| 3,819,901 | 6/1974 | Berinde et al. | 219/76 |
| 3,839,618 | 10/1974 | Muehlberger | 219/121 P |
| 3,900,639 | 8/1975 | Lauterbach | 427/34 |

*Primary Examiner*—J. V. Truhe
*Assistant Examiner*—Fred E. Bell
*Attorney, Agent, or Firm*—Young & Thompson

[57] ABSTRACT

Steel strip is continuously coated with molten metal by passing it through a plasma arc and projecting the molten metal thereon in an inert atmosphere, e.g. nitrogen. The projecting means reciprocates transversely of the strip. The strip is preheated prior to deposition and the surface of the coating is reheated for refusion of only the surface of the coating. An inert atmosphere is maintained in an enclosure surrounding the projecting apparatus, by directing inert gas against the coated strip in a direction opposite to the direction of movement of the strip.

5 Claims, 4 Drawing Figures

APPARATUS FOR THE CONTINUOUS APPLICATION OF A METALLIC COATING TO A METAL STRIP

The present invention relates to apparatus for the continuous application of a metallic coating by projection onto a continuously advancing metal strip in the form of a sheet or band and more particularly onto a steel strip.

Various processes are already available for applying a metallic coating to a metal strip and particularly to a steel strip, in order for example to render it corrosion proof, among which are methods for projecting the coating material. In known processes of this type, metal in molten or powder form is projected with the aid of a pistol or blowpipe or plasma torch onto the surface to be coated which has previously been subjected to chemical or physical treatment with the object of achieving satisfactory adhesion of the coating.

Processes of coating by projecting are used because they are very versatile in application since they can readily be started or stopped, they need no treatment baths nor many manipulative operations necessary and because they do not modify the mechanical properties of the coated product. Nevertheless, these processes have important drawbacks which very considerably limit their field of application. Up to the present, the coatings obtained by these processes lack compactness and under the operational conditions actually known and applied, they undergo a certain degree of oxidation. Moreover, it is generally admitted that the ductility of the coatings obtained by the projection of molten metal is considered to be non-existent and that metallization by projection must always be the final step and that further treatment of the product immediately after the projection process is usually out of the question. It is also known that projection tests using gas blowpipes in an atmosphere of nitrogen have not resulted in any improvement in ductility.

The problem underlying the present invention is that of providing a coating obtained by projection which possesses perfect ductility whatever its thickness, combined with very good adhesion which is an indispensible complementary quality in order to enable the coated product to undergo considerable deformation, especially by stamping or rolling without causing damage to the coating.

A solution to this problem is obtained by a process according to the invention, for the continuous application of a metallic coating to a continuously advancing metal strip in the form of a sheet or band the surface of which has been subjected to chemical and physical preparation and especially to a steel strip, characterized in that molten metal is projected onto the prepared metal sheet while it is passing continuously through a controlled inert atmosphere, in order to regulate the state of oxidation of the applied coating so as to impart thus thereto good ductility and adhesion.

According to a particular feature of the invention, prior to the projection of the metal, the metal sheet is subjected to preheating to a temperature which varies depending on the object to be achieved by said preheating and on the nature of the metal to be projected to form the coating. This temperature is between 100° C. and 400° C. when it is a question of cleaning the metal sheet and projecting a metal such as aluminum or copper; while the preheating temperature lies between 750° C. and 1150° C. when it is desired to produce instantaneous superficial diffusion of the projected metal, such as stainless steel.

According to another particular feature of the invention, the coating is subjected to superficial refusion, carried out in a controlled atmosphere in order to prevent the oxidation thereof and to retain the adhesion and ductility thereof.

For the purpose of carrying out the above-described process, the invention also relates to apparatus by which the projection of the metal onto the metal strip is effected with the aid of at least one projection pistol or blowpipe or plasma torch for applying the coating material to each face.

The apparatus for projecting the coating material is movably mounted at a constant distance from the strip, and is disposed within a sealed enclosure containing an inert atmosphere and provided with inlet and outlet lock chambers for the passage therethrough continuously of the strip of metal and with a smoke or fume extractor. Adjacent the enclosure for the projecting apparatus are located upstream thereof a housing for the preheating apparatus, and downstream thereof a housing for the refusion apparatus. Lock chambers for the passage of the metal are provided between each of the housings and the exterior and between these housings and the said enclosure.

The mobile projection apparatus is mounted on a trolley running on rails transversely situated relative to the strip and reciprocated by a controlling member.

Other objects and features of the invention will be apparent from the following description, taken in conjunction with the accompanying drawings which relate to a plant for carrying out the process according to the invention.

Figure 1:
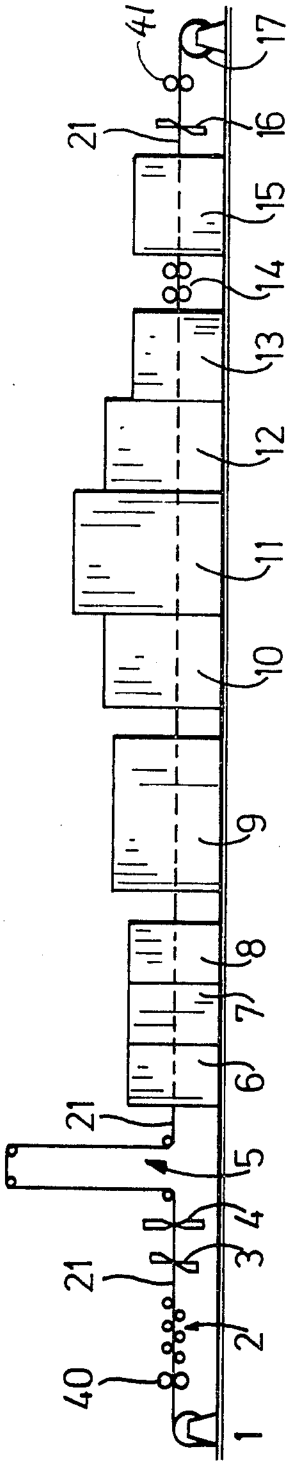
FIG. 1 is a diagrammatic representation of a plant for the continuous application of a coating on a continuously advancing metal strip.

Referring now to the drawings in greater detail, a roll of mild steel strip of the following composition: C 0.040 to 0.100%; Mn 0.200 to 0.500%; P$<$ 0.040% and S$<$ 0.030%, is placed on an unrolling device 1. The unrolled steel strip 21 is gripped and guided between the guide rollers 40 and is fed forward continuously at a constant speed. The steel strip 21 then passes between a series of planishing rollers 2 which make it perfectly flat, and then through a trimming device 3, a welding station 4 and a device 5 which is adapted to form at least one loop of steel strip. It is possible by this means to butt-weld the ends of adjacent sheets so as to ensure a continuous working surface without either interrupting operations or slowing down the speed of feed of the strip passing through the plant at an industrial speed.

The steel strip 21 then undergoes chemical preparation by passing through a degreasing station 6, then a rinsing station 7 and a drying station 8. The dried sheet 21 must then be subjected to physical preparation; to this end it passes through a surface graining station 9 which produces a marked relief on both surfaces adapted to facilitate bonding with the coating which they are to receive; the resulting roughness generally has a value falling between 80 and 200 micro-inches RMS and preferably lying between 100 and 120 micro-inches RMS. A considerable amount of dust is produced in the surface graining station 9, and it is accordingly made airtight by providing lock chambers for the passage of the steel strip at the inlet and outlet, and a compressed air blower and a dust trap (not shown) are also provided.

The steel strip 21 then passes through a lock chamber 10*a* into a preheating enclosure 10, containing an electrical preheating device 10*b* adapted to raise it to a temperature which varies depending on the object to be achieved by said preheating and on the nature of the metal to be used for the coating. Hence, if the object of the preheating is to dry and clean the steel strip, the preheating temperature lies between 100° and 400° C. This is particularly suitable for subsequent coating with aluminum, copper, etc. If the intention is to cause the deposited material to diffuse immediately over the surface, the preheating temperature will lie in that case between 750° C. and 1150° C.; in such case, instant superficial diffusion will take place of the deposited molten metal.

Figure 3:
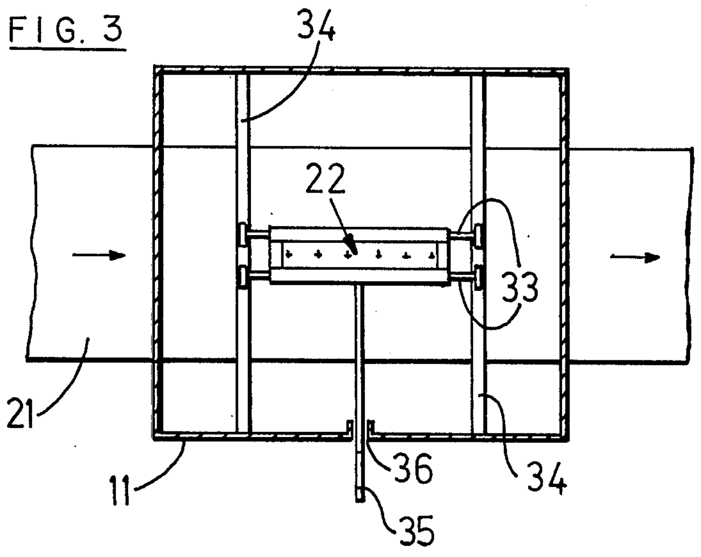
FIGS. 3 and 4 show diagrammatically a trolley and the control device therefor, respectively.

Enclosure 10 is directly upstream of an airtight enclosure 11 containing plasma torches 22. A lock chamber 19 is interposed between the enclosure 10 and 11. Two guide rails 34 are mounted in the enclosure 11 which extend on either side of the strip 21. These rails are disposed athwart the strip 21. A trolley 33 is mounted on the rails situated above the strip 21 which carries a row or series of plasma torches positioned side by side. In similar fashion a trolley 33 also carrying plasma torches positioned side by side is displaceably mounted on rails 34 situated beneath the strip 21. Each of the two trolleys 33 is caused to undergo rectilinear reciprocal movement across the band 21, by means of an arm 35 (FIG. 3) acting as its control member, so that the jets 32 of the plasma torches 22 it carries sweep across the entire width of the band 21, which is eminently favorable to the production of a regular and uniform deposit.

Figure 4:
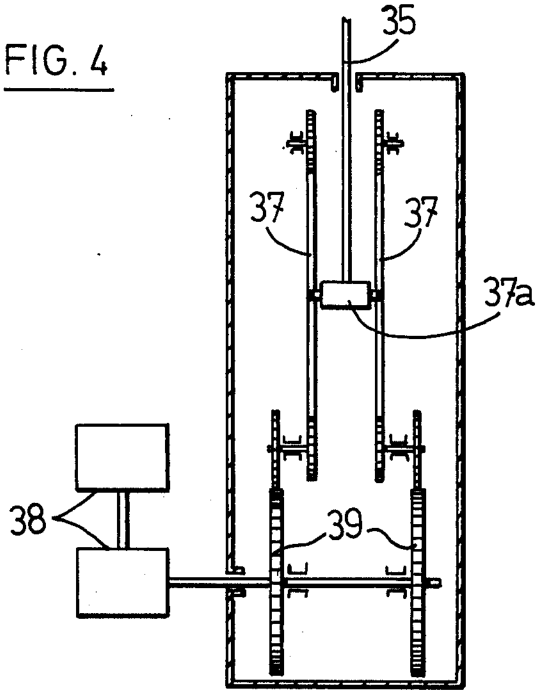

The arm 35 is actuated by any known system such as for example, a pneumatic or hydraulic piston or by a crank and connecting rod system. It may also be driven by a device such as that shown in FIG. 4. In this case, a crosspiece 37*a* is fixed between two parallel chains 37 which drive it since they are themselves driven by a gear train 39 through a motorized speed reducer 38.

Figure 2:
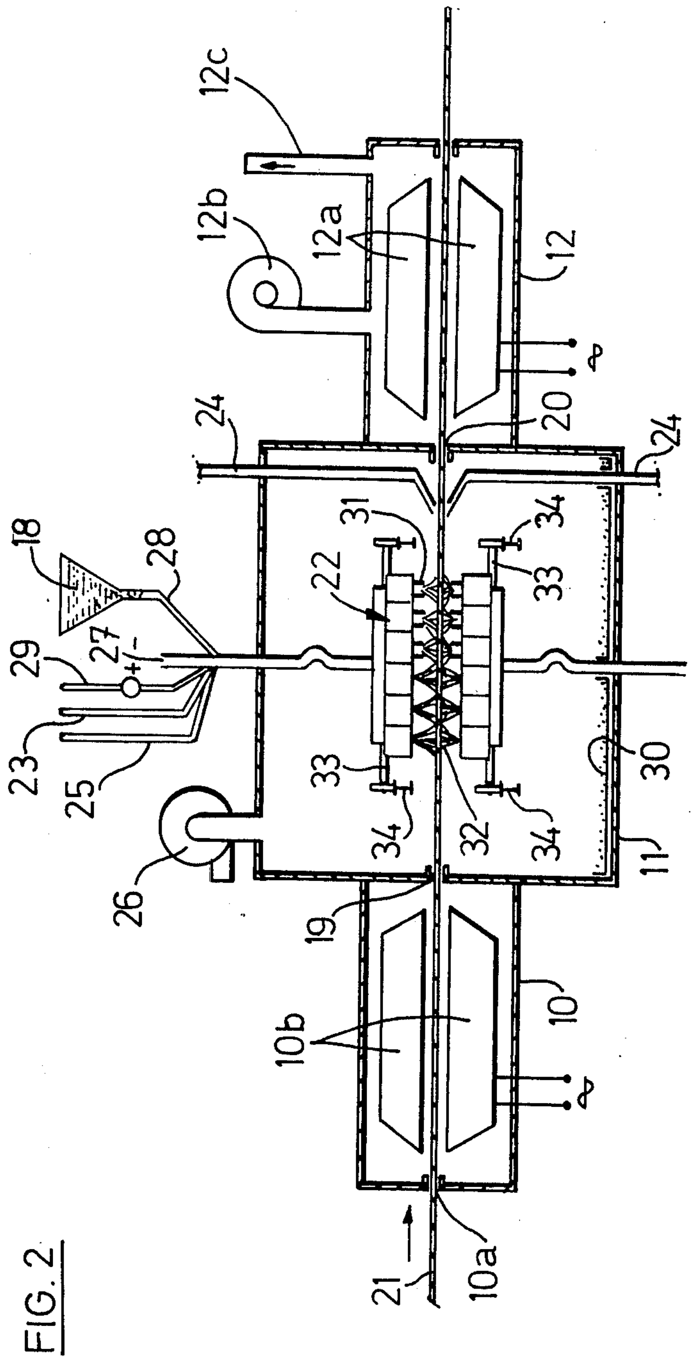
FIG. 2 is a diagrammatic view of the projection, preheating and refusion apparatus.

Each plasma torch 22 shown in FIG. 2 is of known type and will not be described in detail. A plasmagenic gas such as nitrogen is fed to the torches by a pipe 29; electric current is supplied from a current source 27. Cooling water is introduced through the pipe 23 and leaves through the pipe 25. The metal powder to be projected from each torch to form the coating is supplied through a pipe 28. The enclosure 11 is charged with an inert atmosphere consisting of nitrogen led in through pipes 24 which discharge near said band slightly in the rear of the last torch 22. Apart from the fact that this nitrogen creates the protective atmosphere, it tends to cool the coating just before it leaves the enclosure and also to preserve it from oxidation. The nitrogen and the fumes are removed from the enclosure through an extractor 26. Any projected metal particles which have not impinged on the metal sheet 21, are recovered in a collector 30.

If the metal projected is particularly libable to oxidize, the use is recommended of plasma torches the nozzles of which are extended by enveloping necks 31 which surround the jets 32 of molten metal, as will be seen in the case of some of the torches in FIG. 2.

The nature of the metal powder 18 varies in accordance with the character of the desired coating and may consist of a pure metal or of an alloy. Thus for example, it may consist of aluminum, copper, a Ni—Cr stainless steel, or ferro-chromium.

The grain size of the powder can be up to 105 micrometers. The resulting coating has a thickness which can be from 50 to 100 micrometers.

Once it has been coated, the strip leaves the enclosure 11 through a lock chamber 20 and immediately enters a refusion compartment 12 which contains a refusion apparatus 12*a* wherein a temperature obtains depending on the type of coating. This refusion, which is carried out under an inert atmosphere formed by nitrogen introduced by means of the pump 12*b* and discharged at 12*c*, is undertaken in order to produce a fine surface finish.

After refusion and still in an atmosphere of nitrogen, the metal strip, the coating of which has just been refused, enters a cooling chamber 13 also containing an inert atmosphere, where its temperature is brought down to about 50° C. so as to avoid any risk of oxidation. The cooled strip then reaches a compression system 14 which includes a series of feed rolls which are also adapted to bring about a reduction in thickness of the strip of from 0.2 to 5%, which greatly assists in rendering the coating very compact.

If the strip is to be subjected to a final annealing in the form of an open coil, use is made for this purpose in the chamber 15 of a device for separating the turns. The coated strip arrives finally at the cutting station 16 which enables it to be delivered in the form of separate sheets or in the form of rolls of varying length, in which case it then reaches the reeling device 17, passing en route through tensioning rolls 41.

The metal strip delivered by the plant may be used in this state in view of its very attractive appearance.

Metal strip coated by the method described in connection with the foregoing installation may be subjected subsequently to all sorts of treatment such as for example, cold rolling, recrystallization annealing, diffusion annealing, cold hardening or skin-pass, burnishing, stamping, without causing any degradation of the coating. All possibilities of subsequent usage of the coated metal sheet are due to the ductility, density and adhesion of the resulting coating; these three qualities also have the effect of providing a perfect degree of protection against corrosion. It should also be noted, moreover, that metallization by projection produces no change, neither of the analysis, nor of the mechanical characteristics of the metal substrate.

Metal strip obtained by cold or hot rolling has been coated by the above-described method, with different metals or alloys and then subjected to tests; and these have invariably confirmed the perfect bonding of the coating.

Thus for example, aluminum coatings have shown good adhesion in the Erichsen test as 6mm and an excellent resistance to saline mist, to an atmosphere of $SO_2$ and to oxidation in th air up to a temperature of 650° C. Copper coatings have stood up well to the Erichsen test at 6mm; and nickel-chromium stainless steel coatings have satisfactorily withstood the Erichsen test at 6mm, exposure to salt mist and oxidation, their performance in these respects being comparable to that of solid stainless steel of the same composition.

Finally, bending tests on coated strips have shown that the adhesion was good; after having bent back the band on itself, the coating has not shown any damage and even after being folded in pocket handkerchief fashion, i.e. folded twice quite flat on itself, there was no flaking off at the folds.

From a consideration of the foregoing disclosure, therefore, it will be evident that the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. Apparatus for the continuous application of a metallic coating to a metal strip, comprising:
   an airtight enclosure,
   means for continuously advancing the metal strip lengthwise of itself through said enclosure
   at least one plasma torch for projecting molten metal onto the continuously advancing metal strip
   a trolley carrying said plasma torch
   fixed rails carrying said trolley and extending parallel to the plane of said metal strip and perpendicular to the longitudinal direction thereof
   means for reciprocating said trolley with said plasma torch, on said rails, within said enclosure across the entire width of said metal strip
   and means for maintaining an inert atmosphere in said enclosure.

2. Apparatus according to claim 1, further comprising means for introducing inert gas with means for directing said gas against and along the coated face to said metal strip towards the jet issued from said at least one plasma torch, said gas controlling the atmosphere near said coated face of said metal strip in order to regulate the state of oxidation of the applied coating.

3. Apparatus according to claim 1, further comprising:
   a preheating enclosure located upstream of said airtight enclosure,
   and electrical heating means for preheating said metal strip in said preheating enclosure prior to its introduction into said airtight enclosure.

4. Apparatus according to claim 1, further comprising:
   a refusion enclosure located downstream said projecting enclosure,
   and electrical means for heating and partially remelting the coating of said coated metal strip into said refusion enclosure after its passage through said projecting enclosure.

5. Apparatus according to claim 4, further comprising:
   a cooling chamber located downstream of said refusion enclosure,
   and cooling means for cooling the coating of said metal strip in said cooling chamber after its passage through said refusion enclosure.

* * * * *